United States Patent
Kwak et al.

(10) Patent No.: US 6,861,297 B2
(45) Date of Patent: Mar. 1, 2005

(54) METHOD OF MAKING A LIQUID CRYSTAL DEVICE

(75) Inventors: Dong Yeung Kwak, Daeku-shi (KR); Gun Hee Lee, Kumi-shi (KR)

(73) Assignee: LG. Philips LCD Co., Ltd., Seoul (KR)

(*) Notice: Subject to any disclaimer, the term of this patent is extended or adjusted under 35 U.S.C. 154(b) by 300 days.

(21) Appl. No.: 09/736,310

(22) Filed: Dec. 15, 2000

(65) Prior Publication Data

US 2001/0024254 A1 Sep. 27, 2001

(30) Foreign Application Priority Data

Dec. 17, 1999 (KR) .......................................... P99-58747

(51) Int. Cl.$^7$ ........................ H01L 21/00; G02F 1/136; G02F 1/1333; G02F 1/1343; G02F 1/1345
(52) U.S. Cl. ...................... 438/149; 438/153; 438/154; 438/161; 438/162; 438/166; 349/42; 349/43; 349/46; 349/54; 349/138; 349/139; 349/140; 349/143; 349/149
(58) Field of Search ................................. 438/149, 153, 438/154, 161, 162, 166; 349/42, 43, 46, 138–140, 143, 149

(56) References Cited

U.S. PATENT DOCUMENTS 6,127,199 A * 10/2000 Inoue et al.
6,512,243 B1 * 1/2003 Kim et al.

* cited by examiner

Primary Examiner—John F. Niebling
Assistant Examiner—Stanetta Isaac
(74) Attorney, Agent, or Firm—Birch, Stewart, Kolasch & Birch, LLP

(57) ABSTRACT

A liquid crystal display device and a fabricating method thereof wherein an adhesive force between a seal and a lower plate is improved upon bonding of an upper plate to the lower plate. In high aperture liquid crystal display panels, organic protective films are used to reduce dielectric constants. However, the seal, used when bonding the upper and lower plates of the liquid crystal panel, generally do not adhere well to organic materials. In this invention, holes are generated in the organic protective film so that the seal bonds with inorganic materials such as the lower glass plate or the gate insulating film. A method is also presented to precisely control the amount of the gate insulating film to be etched using the EPD window technique.

23 Claims, 18 Drawing Sheets

METHOD OF MAKING A LIQUID CRYSTAL DEVICE

FIELD OF THE INVENTION

This invention relates to a liquid crystal display, and more particularly to a liquid crystal display device and a fabricating method thereof wherein bonding characteristics between a seal and a lower plate are improved.

BACKGROUND OF THE INVENTION

Generally, a liquid crystal display (LCD) controls the amount of light transmitted from liquid crystal cells in response to video signals to thereby display a picture on a liquid crystal panel. The cells are typically arranged in a matrix pattern. The liquid crystal panel includes liquid crystal cells arranged in an active matrix type and driving integrated circuits (IC's) for driving the liquid crystal cells.

The driving ICs are usually manufactured in chip form and mounted on a tape carrier package (TCP) film attached to the outer periphery of the liquid crystal panel. The ICs are also connected by a tape automated bonding (TAB) system mounted along the outer periphery of the liquid crystal panel when the IC's are connected by a chips-on-glass (COG) system.

In the case of TAB system, the driving IC's are electrically connected to a pad portion disposed along an edge of the liquid crystal panel by the TCP. The pad portion is connected to electrode lines, which are in turn connected to each liquid crystal cell of the liquid crystal panel, to apply driving signals generated from the driving IC's to each liquid crystal cell.

FIG. 1 is a plan view showing a structure of a conventional liquid crystal display panel. As shown, the liquid crystal panel 2 includes a lower plate 4 and an upper plate 6 bonded to each other. The liquid crystal panel 2 also includes a picture display part 8 having liquid crystal cells arranged in a matrix pattern; gate pads 12 and data pads 14 connected between driving IC's (not shown) and the picture display part 8; gate links 34 and data links 16 for connecting the gate pads 12 and the data pads 14 to the picture display part 8, respectively; and a seal 10 provided at the outer periphery of the picture display part 8 so as to bond the lower plate 4 to the upper plate 6.

Within the picture display part 8, a plurality of data lines 13 intersect with the plurality of gate lines 11 on the lower plate 4. A video signal is applied to each data line 13 via the data pad 14 and the data link 16 and a scanning signal is applied to each gate line 11 via the gate pad 12 and the gate link 34. At each intersection, each liquid crystal cell is provided with a thin film transistor (TFT) and a pixel electrode connected to the thin film transistor. The TFT provides a switching function to apply a data signal to drive the liquid crystal cell.

Red, green, and blue color filters are formed on the upper plate 6. The color filters are separated by a black matrix and a common transparent electrode is formed on the surfaces of the color filters.

The lower plate 4 and the upper plate 6 are spaced apart by a spacer to provide a constant cell gap. The lower plate 4 is bonded to the upper plate 6 by the seal 10, which is positioned along outer edges of the picture display part 8. The cell gap area is injected with liquid crystal to form the liquid crystal layer, and thereafter is sealed.

The gate pads 12 and the data pads 14 are located at the edge of the lower plate 4 not overlapped by the upper plate 6. Each gate pad 12 applies a scanning signal from the gate driving IC to the gate line 11 via a wire within the TCP film and the gate link 34. Also, each data pad 14 applies a video data signal from the data driving IC to the data line 13 via the data link 16.

In the conventional liquid crystal panel 2 as described above, a protective film is coated on the entire lower plate 4 to protect the metal electrode lines and the thin film transistors. Also the pixel electrode, which is connected via a contact hole to the TFT, is formed on the protective film for each cell area. The pixel electrode is a transparent electrode made from indium tin oxide (ITO), which has a relatively strong durability.

Generally, an inorganic material such as $SiN_X$ or $SiO_X$ is used as the protective film. These typically have high dielectric constants. Because of the high dielectric constants, the conventional liquid crystal with inorganic protective films suffers from a coupling effect caused by an increase in parasitic capacitance between the pixel electrode and the data line 13.

A way to minimize the coupling effect is to keep the two electrodes at a relatively long distance, for example, of 3 to 5 $\mu$m so that the pixel electrode dose not overlap with the data line 13. However, due to the increased spacing, it is necessary to form an area of the pixel electrode applying a voltage to the liquid crystal layer to be as narrow as possible. In such instance, aperture ratio of the liquid crystal cell, which depends on the area of the pixel electrode, is reduced.

A way to overcome this problem, i.e. minimize the coupling effect but still achieve higher aperture ratio, is to use protective films made of organic materials. Organic materials such as benzocyclobutene (BCB), spin on glass (SOG), or Acryl, have relatively low dielectric constants. Due to the low dielectric constants, the area of the pixel electrode can be enlarged to improve aperture ratios of the liquid crystal cell.

Unfortunately, a high aperture ratio LCD employing the organic protective film suffers from problems of its own. When bonding the upper and lower plates, a seal is used. As shown in FIG. 1, the seal 10 makes contact with the organic protective film (shown in FIGS. 3A and 3B) as the plates are bonded.

Typically, epoxy resin is used as the seal. Such seal strongly adheres to inorganic protective films and glass substrates, but weakly adheres to organic materials such as the organic protective film. Thus, the high aperture ratio LCD employing the organic protective film is much more likely to develop leakage problems when the liquid crystal panel is subjected to physical stresses such as an impact.

In addition, the conventional LCD typically has a gate insulating layer disposed between the glass substrate and the organic protective film. Unfortunately, an organic protective film has poor adherence to the gate insulating film as well. Accordingly, a crack may be generated between the organic protective film and the gate insulating film due to physical stresses. As a result, the organic protective film could be floating or the liquid crystal may leak. Such problems of the conventional liquid crystal are described in further detail with reference to the accompanying drawings.

FIG. 2 is an enlarged plan view showing a crossing portion between the data link and the seal in FIG. 1. As shown, the data link 16 is formed along with the data pad 14 and the data line 13. A semiconductor layer 18 extends from the data line 13 into the data pad 14 at the lower portion of the data link 16. The seal 10 is located on the organic protective film in a direction crossing the data link 16. The data pad 14 contacts a transparent electrode 17 on the organic protective film through a contact hole 19 defined in the organic protective film. The transparent film 17 is connected to the data driver IC mounted on the TCP film. The transparent film 17 is designed to protect a metal electrode as well as to prevent oxidation of the metal electrode during the TAB process.

FIG. 3A shows a vertical section of the liquid crystal display panel taken along the 3A–3A' line in FIG. 2, and FIG. 3B shows a vertical section of the liquid crystal display panel taken along the 3B–3B' line in FIG. 2. In FIGS. 3A and 3B, the lower plate 4 includes a lower glass substrate 20, a gate insulating layer 22, a semiconductor layers 18, the data links 16, and an organic protective film 24. As shown, the gate insulating layer 22, the semiconductor layers 18 and the data links 16 are sequentially deposited on the glass substrate 20, and the organic protective film 24 covers the entire resulting surface.

The upper plate 6 includes of an upper glass substrate 30, color filters (not shown), a black matrix 28, and a common transparent electrode 26. As shown, the color filters and the black matrix 28 are formed on the upper glass substrate 30, and the common transparent electrode 26 is formed thereon.

The seal 10 bonds the lower plate 4 and the upper plate 6 to each other. As described previously, the seal 10 weakly adheres to the organic protective film 24. In addition, the organic protective film 24 weakly adheres to the gate insulating film 22 due to the inorganic nature of the gate insulating film 22. As a result, the organic floating film 24 may float or crack due to physical stresses thus causing liquid crystal 32 to leak.

FIG. 4 is an enlarged plan view showing a crossing portion between the gate link and the seal in FIG. 1. As shown, the gate link 34 is formed with the 11 gate pad 12 and the gate line 11. The gate pads 12 contacts the transparent electrodes 17 through the contact hole 19 formed in the gate insulating film and the organic protective film. The seal 10 crosses the gate link 34.

FIG. 5A shows a vertical section of the liquid crystal display panel taken along the 5A–5A' line in FIG. 4, and FIG. 5B shows a vertical section of the liquid crystal display panel taken along the 5B–5B' line in FIG. 2. In FIGS. 5A and 5B, the upper plate 6 is much like the structure as shown in FIGS. 3A and 3B, respectively. The lower plate 4 is slightly different in that instead of having semiconductor layer and data link disposed between the organic protective film 24 and the gate insulating layer 22, gate link 34 is disposed between the gate insulating layer 22 and the glass substrate 20 (compare FIGS. 3A and 5A).

Again because the organic protective film 24 has weak adherence to both the seal 10 and the gate insulating layer 22, leakage may develop due to physical stresses.

SUMMARY OF THE INVENTION

Accordingly, it is an object of the present invention to provide a liquid crystal display device and a fabricating method thereof wherein bonding characteristics between seal and a lower plate is improved upon bonding of an upper plate to the lower plate, thereby preventing a leakage of liquid crystal from an exterior impact.

In order to achieve these and other objects of the invention, a liquid crystal display device according to one aspect of the present invention includes an organic protective film coated on a lower plate of the liquid crystal display panel, wherein the protective film has a plurality of holes to infiltrate the seal between the electrode links; and an inorganic gate insulating film formed below the organic protective film and being contacted with the seal through the holes.

A method of fabricating a liquid crystal display device according to another aspect of the present invention includes the steps of removing the protective film and partially removing the gate insulating film to a predetermined thickness to define holes between the gate electrode links and the data electrode links; and contacting the seal with the gate insulating film through the holes.

Also, a lower plate of the a liquid crystal display device according to another aspect of the present invention includes a glass plate; a gate insulating film formed over the lower glass plate wherein at least a portion of the gate insulating film is etched forming an adherence surface; a protective film formed over the gate insulating film wherein a portion of the protective film above the adherence surface is completely etched to expose the adherence surface; and a seal with a contact extension portion making contact with said adherence surface.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
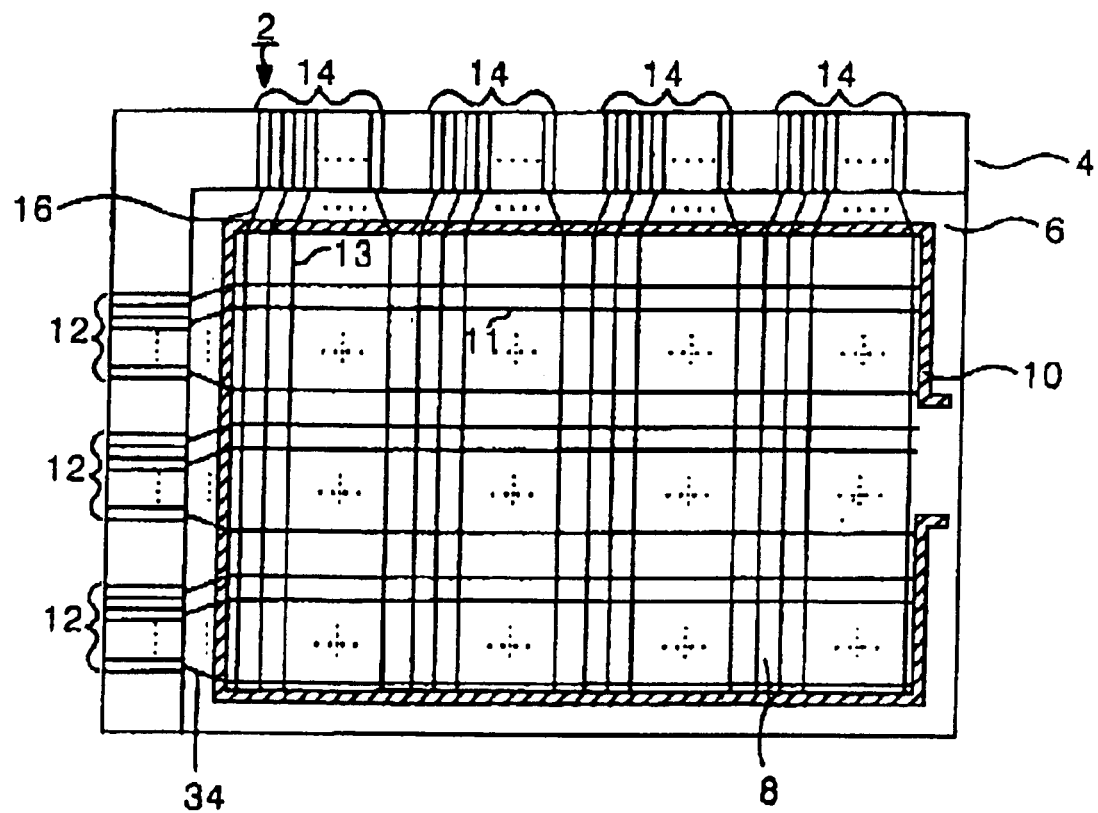
FIG. 1 is a schematic plan view showing a structure of a conventional liquid crystal display panel.
Figure 2:
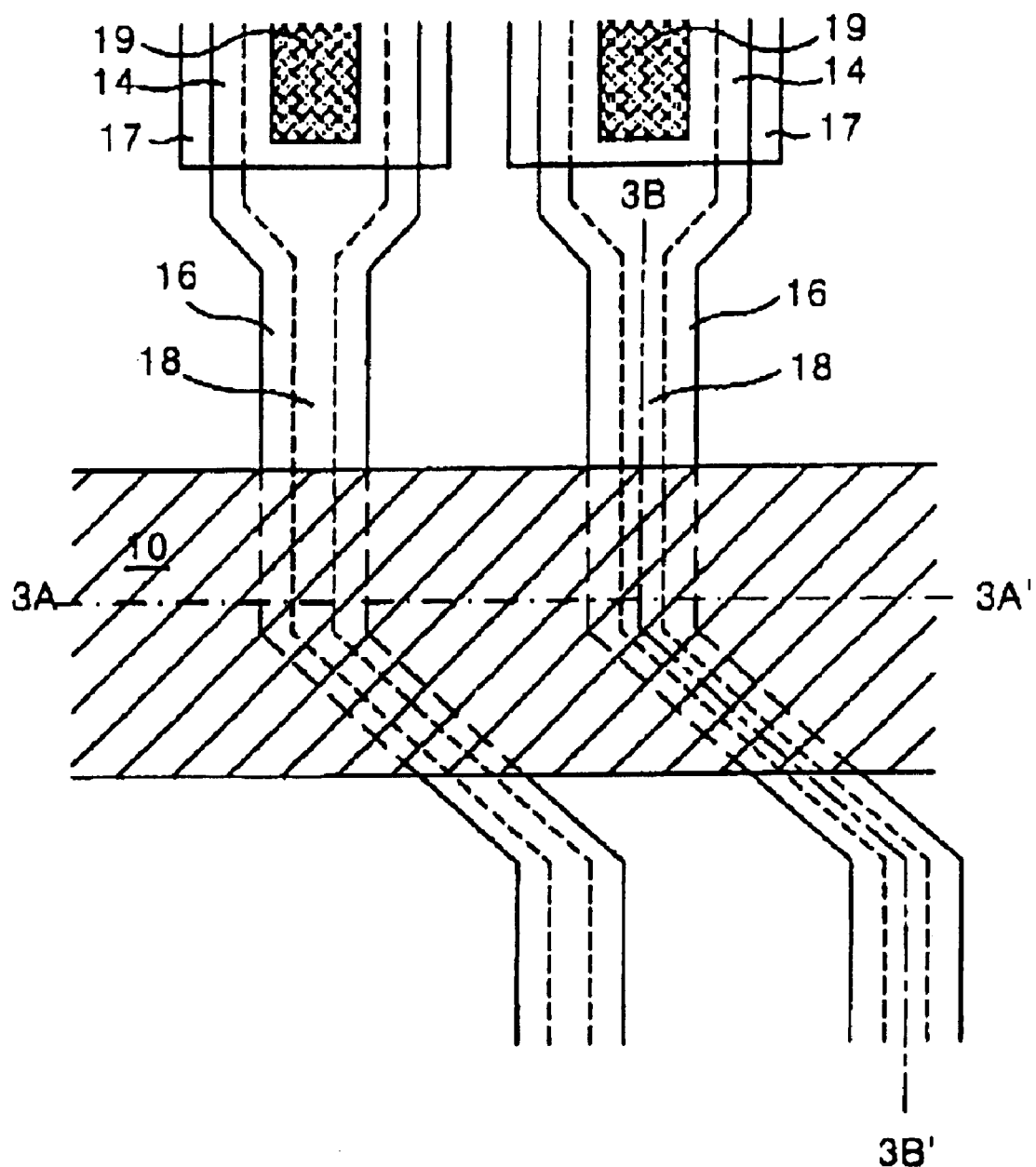
FIG. 2 is an enlarged plan view of a crossing portion between the data link and the seal in FIG. 1.
Figure 3A:
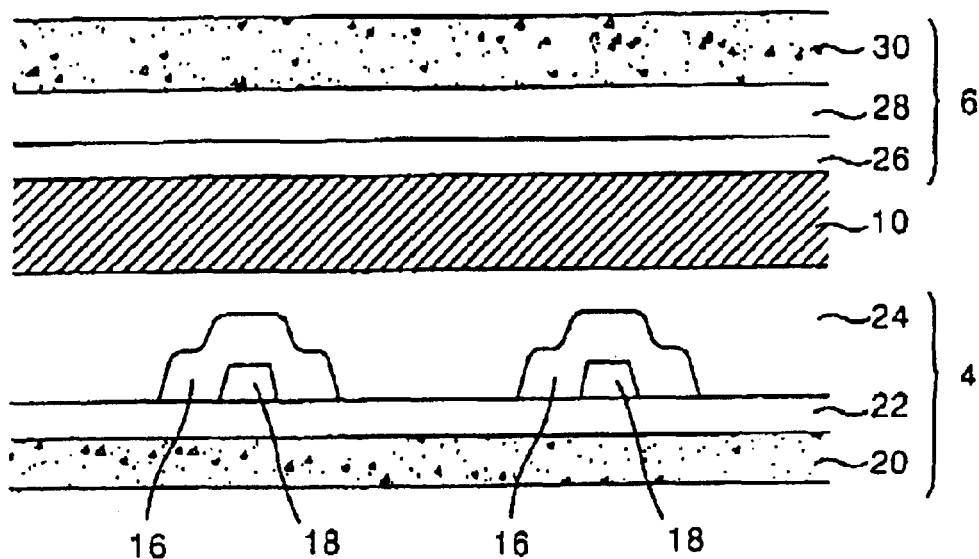
FIG. 3A is a vertical section view of the liquid crystal display panel taken along the 3A–3A' line in FIG. 2.
Figure 3B:
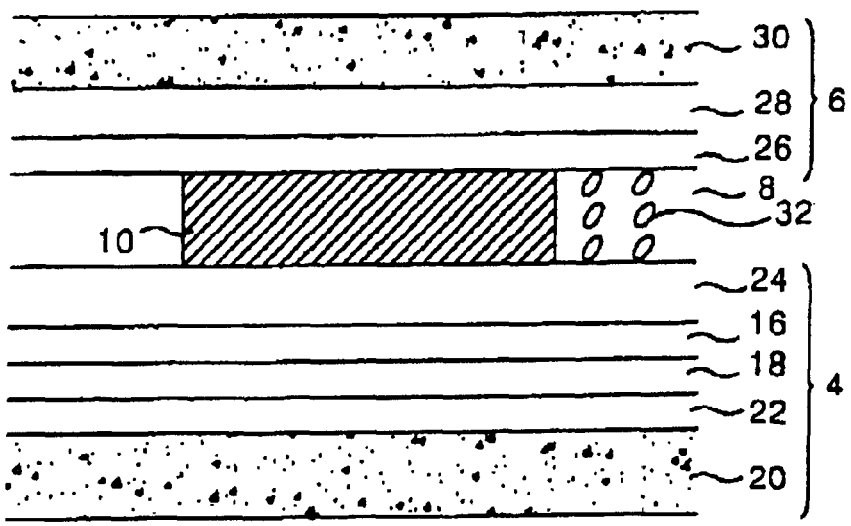
FIG. 3B is a vertical section view of the liquid crystal display panel taken along the 3B–3B' line in FIG. 2.
Figure 4:
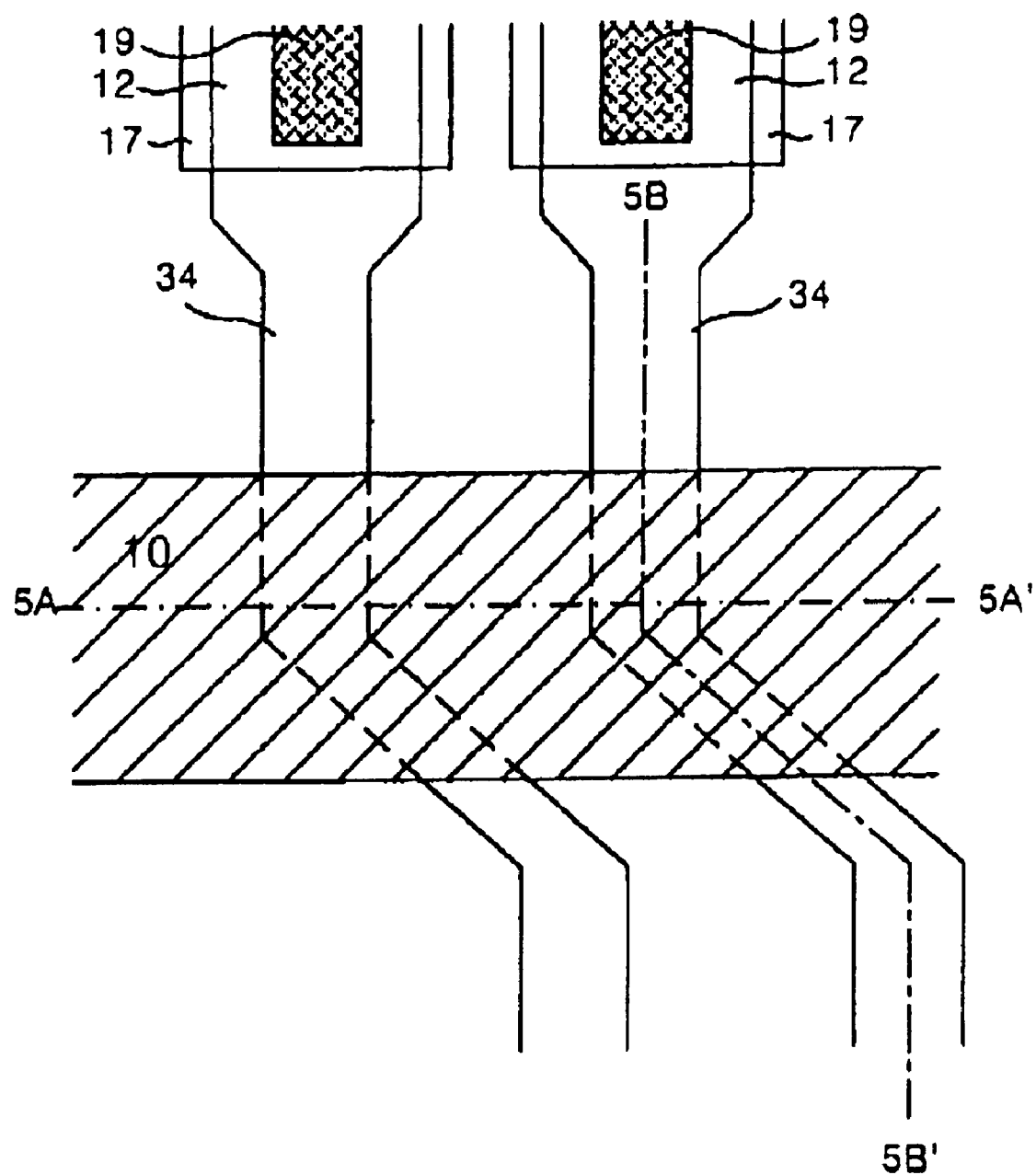
FIG. 4 is an enlarged plan view of a crossing portion between the gate link and the seal in FIG. 1.
Figure 5A:
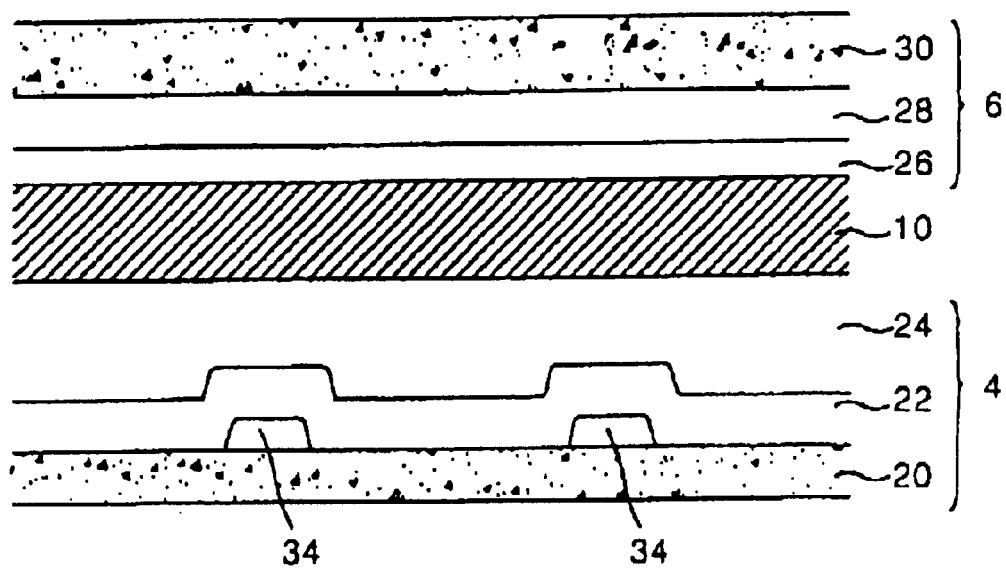
FIG. 5A is a vertical section view of the liquid crystal display panel taken along the 5A–5A' line in FIG. 4.
Figure 5B:
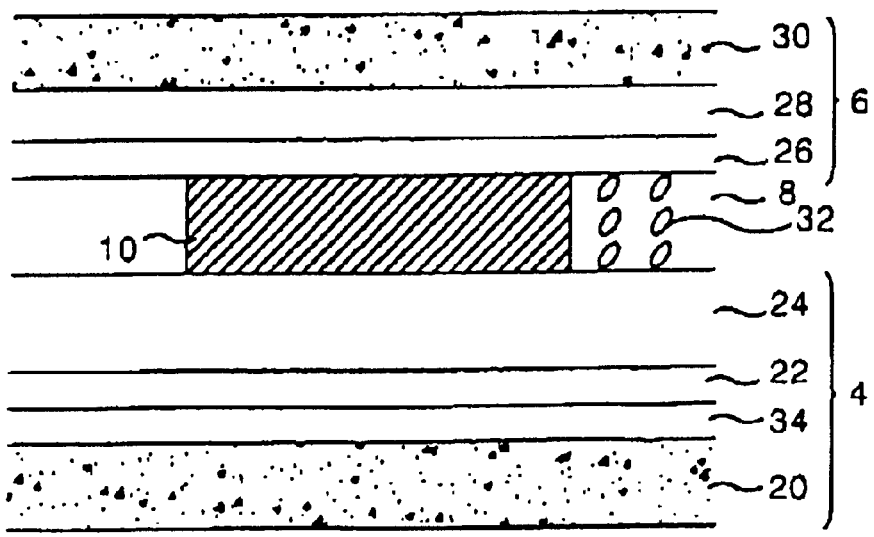
FIG. 5B is a vertical section view of the liquid crystal display panel taken along the 5B–5B' line in FIG. 4.
Figure 6:
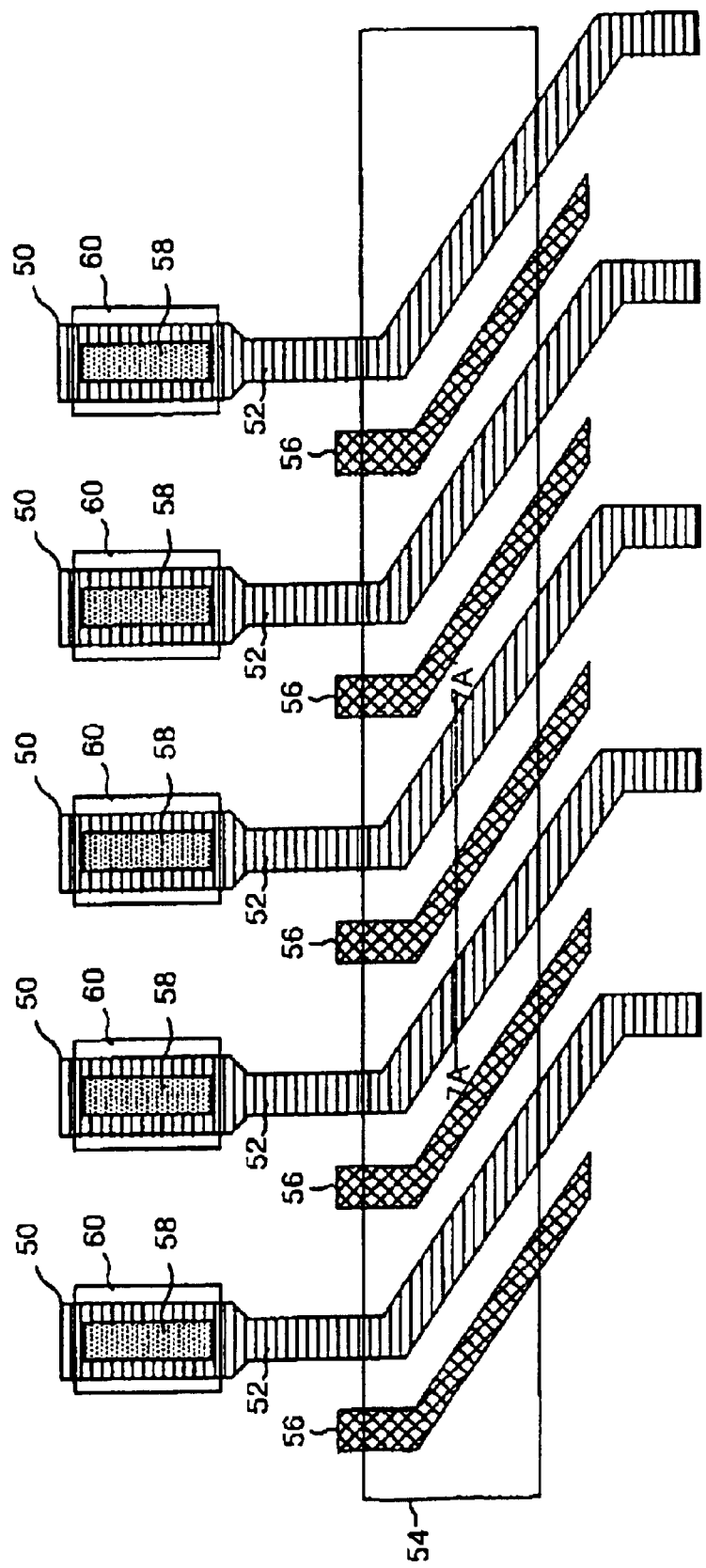
FIG. 6 is a plan view showing a structure of a portion at which data links cross a seal part in a high aperture ratio liquid crystal display device employing an organic protective film according to an embodiment of the present invention.

FIG. 6 is a plan view showing a structure of a portion at which data links cross a seal part in a high aperture ratio liquid crystal display device employing an organic protective film according to an embodiment of the present invention.

Some elements and features of the liquid crystal panel are similar to those of the conventional structure. For example, the data links 52 are formed with data pads 50 and data lines. At the lower portion of the data link 52, a semiconductor layer extends from the data line to the data pad 50. The seal 54 is formed on the organic protective film in a direction crossing the data links 52. The data pads 50 are connected to a transparent electrode 60 on the organic protective film via contact holes 58 defined in the organic protective film.

As shown, holes 56 are formed in the seal 54 in between data links 52. In this embodiment, the organic protective film and the gate insulating film are etched to form the holes 56. The gate insulating film may be completely etched to expose the lower glass substrate so as to enable contact between the seal 54 and the lower glass substrate when the upper and lower plates of the liquid crystal panel are bonded.

Figure 7:
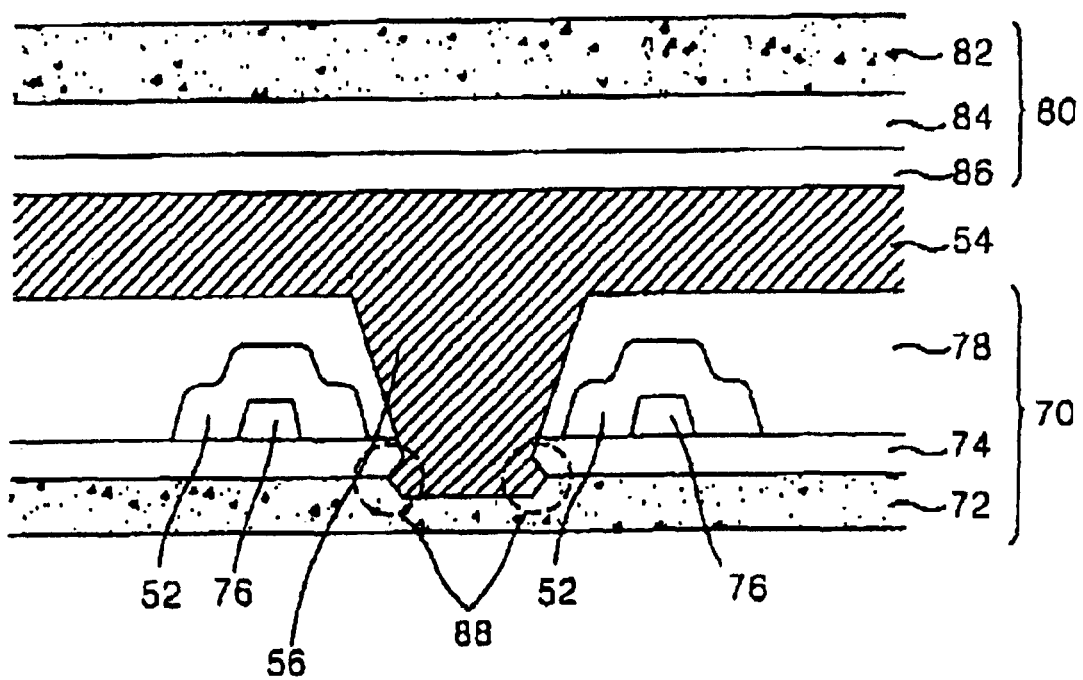
FIG. 7 is a section view of the liquid crystal display panel taken along the 7A–7A' line in FIG. 6 in which the organic protective film and the gate insulating film are etched to expose the lower glass substrate upon formation of the holes of FIG. 6.

FIG. 7 is a section view of the liquid crystal display panel taken along the 7A–7A' line in FIG. 6 in which the organic protective film and the gate insulating film are etched to expose the lower glass substrate upon formation of the holes 56 of FIG. 6. As shown, the lower plate 70 includes a glass substrate 72, a gate insulating film 74, a semiconductor layer 76, data links 52, and an organic protective film 78. The insulating film 74, the semiconductor layer 76, and the data links 52 are sequentially deposited on the glass substrate 70, and then the organic protective film 78 is coated thereon.

Also as shown, the organic protective film 78 and the gate insulating film 74 between the data links 52 are etched to form holes 56. Each hole 56 is formed by dry etching the organic protective film 78 and the gate insulating film 74 to expose the glass substrate 72. The etching is controlled using an etch point detection (EPD) window provided at the outer area of the panel (explained later).

The upper plate 80 includes an upper glass substrate 82, color filters (not shown) and a black matrix 84 formed on the upper glass substrate 82, and a common transparent electrode 86 formed entirely thereon.

The lower plate 70 and the upper plate 80 are bonded together by the seal 54. As seen in FIG. 7, the seal 54 contacts the lower glass substrate 72 via the hole 56. Since the seal 54 strongly adheres to the glass substrate 72, the bonding between upper plate 80 to the lower plate 70 is dramatically improved.

Figure 8:
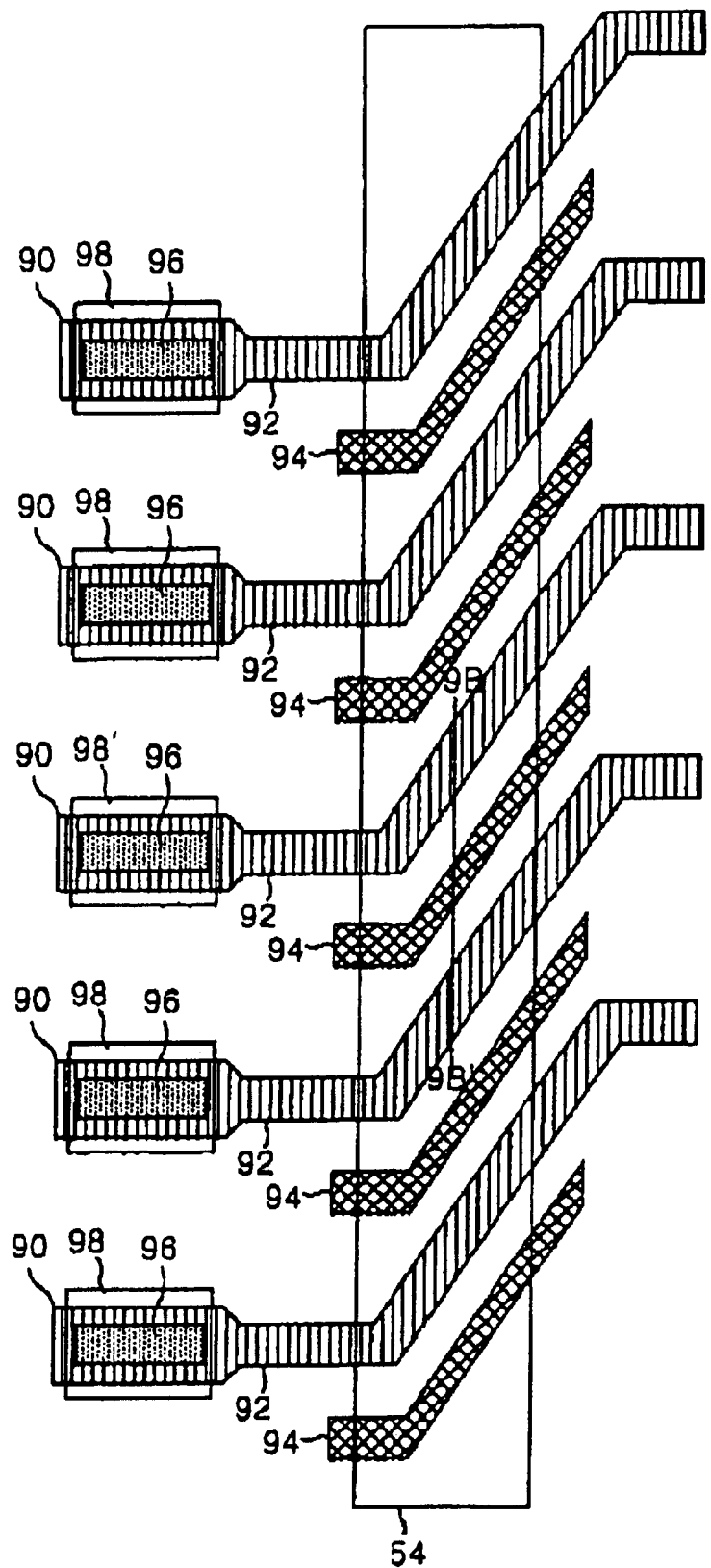
FIG. 8 is a plan view showing a structure of a portion at which gate links cross a seal part in a high aperture ratio liquid crystal display device employing an organic protective film according to the embodiment of the present invention.

FIG. 8 is a plan view showing a structure of a portion at which gate links cross a seal part in a high aperture ratio liquid crystal display device employing an organic protective film according to the embodiment of the present invention. As shown, holes 94 are formed on the seal 54 in between gate links 92.

Other elements and features of the liquid crystal panel are similar to those of the conventional structure. For example, the gate links 92 are formed with gate pads 90 and gate lines. The seal 54 is formed in a direction crossing the gate links 92 on the organic protective film of the lower plate. The gate pad 90 is connected to a transparent electrode 98 on the organic protective film via a contact hole 96.

Again, the organic protective film and the gate insulating film are etched to form the holes 94. The gate insulating film may be completely etched to expose the lower glass substrate so as to enable contact between the seal 54 and the lower glass substrate when the upper and lower plates of the liquid crystal panel are bonded.

Figure 9:
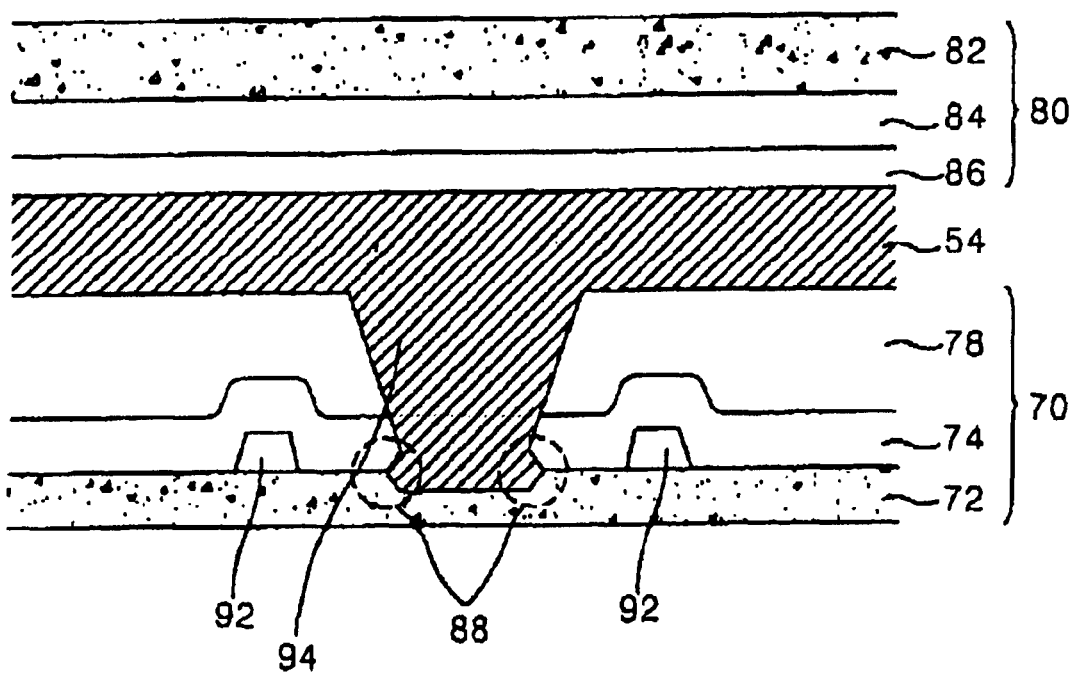
FIG. 9 is a section view of the liquid crystal display panel taken along the 9B–9B' line in FIG. 8 in which the organic protective film and the gate insulating film are etched to expose the lower glass substrate upon formation of the holes of FIG. 8.

FIG. 9 is a section view of the liquid crystal display panel taken along the 9B–9B' line in FIG. 8 in which the organic protective film and the gate insulating In film are etched to expose the lower glass substrate upon formation of the holes 94 of FIG. 8. The upper plate 80 is much like the structure as shown in FIG. 7. The lower plate 70 is slightly different in that instead of having semiconductor layer and data link disposed between the organic protective film 78 and the gate insulating layer 74, gate links 92 are disposed between the gate insulating layer 74 and the glass substrate 72 (compare FIGS. 7 and 9).

Also, similar to the data link part as shown in FIG. 7, the organic protective film 78 and the gate insulating film 74 between the gate links 92 are etched to form the hole 94. The hole 94 is formed by dry etching the organic protective film 78 and the gate insulating film 74 to expose the glass substrate 72. This etching is controlled using the EPD technique.

As discussed above regarding FIG. 7, the lower plate 70 and the upper plate 80 are bonded together by the seal 54. As seen in FIG. 9, the seal 54 contacts the lower glass substrate 72 via the hole 94. Since the seal 54 strongly adheres to the glass substrate 72, the bonding between upper plate 80 to the lower plate 70 is dramatically improved.

Note that both the holes 56 and 94 extend beyond the edges of the seal 54. This prevents air bubbles from being generated inside the holes.

Improvement can be made when defining the holes 56 or 94. In the above embodiment, the organic protective film 78 and the gate insulating film 74 are etched to expose the lower glass substrate 72. However, during the actual etching process, a portion of the lower glass substrate 72 may be etched as well.

This over-etching causes undercuts 88 to be formed as shown in FIGS. 7 and 9. The undercuts 88 are physically weak points and thus are susceptible cracks from physical stresses.

Therefore, it is desirable to maintain the increased bonding characteristics and remove problems associated with the undercuts. To this end, when holes are formed, only a portion of the gate insulating film is removed during the dry etching and thus the glass substrate is not exposed. In this instance, the undercuts are not generated. Also, because the seal strongly adheres to the gate insulating film, the bonding characteristics are maintained.

Figure 10:
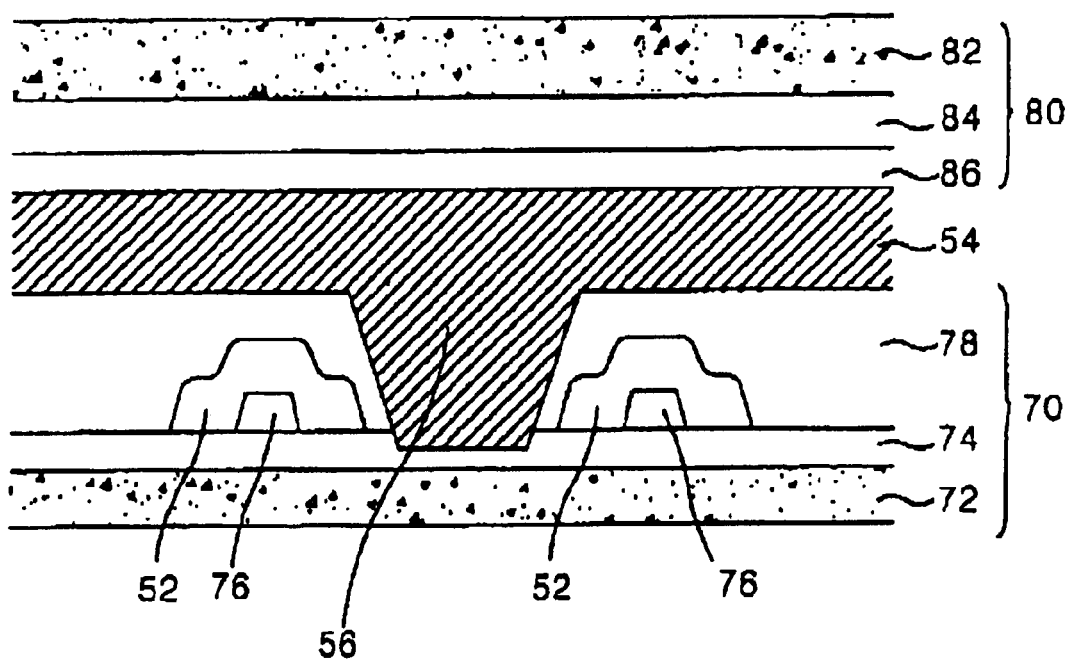
FIG. 10 is a section view of the liquid crystal display panel taken along the 7A–7A' line in FIG. 6 in which the gate insulating film is partially etched upon formation of the holes of FIG. 6.
Figure 11:
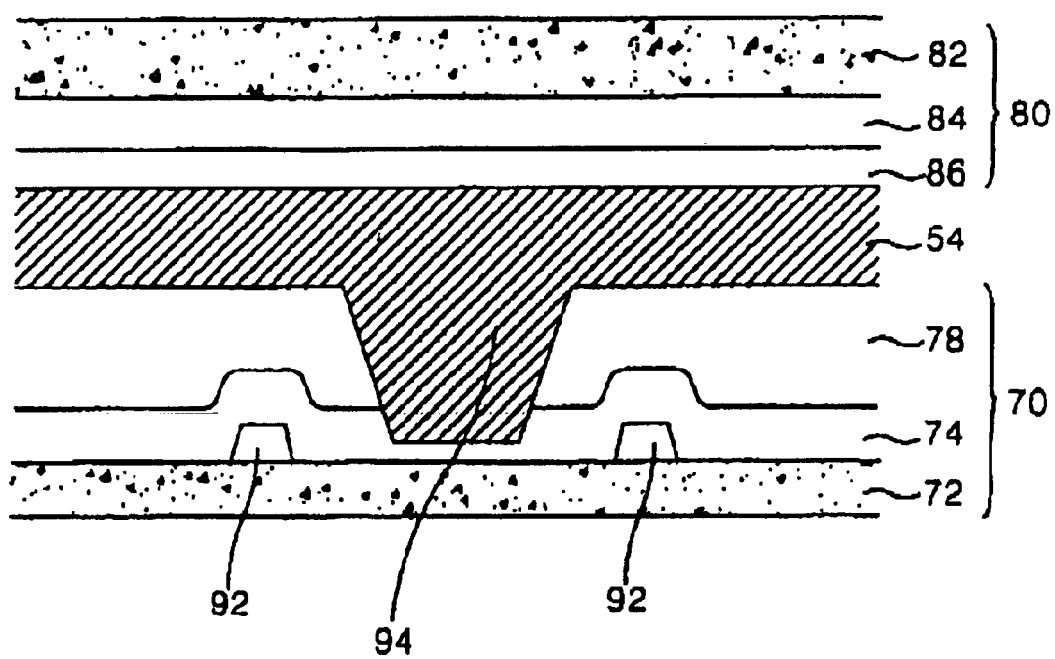
FIG. 11 is a section view of the liquid crystal display panel taken along the 9B–9B' line in FIG. 8 in which the gate insulating film is partially etched upon formation of the holes of FIG. 8.

FIG. 10 is a section view of the liquid crystal display panel taken along the 7A–7A' line in FIG. 6 in which the gate insulating film is partially etched upon formation of the holes 56. Likewise, FIG. 11 is a section view of the liquid crystal display panel taken along the 9B–9B' line in FIG. 8 in which the gate insulating film is partially etched upon formation of the holes 94. As shown in FIGS. 10 and 11, the entire organic protective film 78 and a portion of the gate insulating film 74 are etched, i.e., the holes 56 and 94 do not expose the glass substrate as in FIGS. 7 and 8. Other structure and features in FIGS. 10 and 11 are similar to those in FIGS. 7 and 8, respectively.

The etching work is performed by a dry etching technique using an EPD technique (described later) to control the amount of the gate insulating film 74 that is etched. The seal 54 contacts the gate insulating film 74. Since the seal adheres strongly to the inorganic insulating film 74, bonding characteristics between the upper plate 80 and the lower plate 70 remains dramatically improved over the conventional art. Also, since the lower glass substrate 72 is not exposed, problems related to the undercuts are avoided.

A mechanism is needed to precisely control the amount of gate insulating film 74 etched when forming the holes 56 and 94. In a general dry etching process, reactive gases are generated from a chemical reaction between the etchant and the organic protective film 78 as well as between the etchant and the gate insulating film 74. This gas generation can be monitored to control the etching process. In this embodiment, EPD window technique is used to monitor the gas generation and thus control the amount of the insulating layer that is etched.

Figure 12:
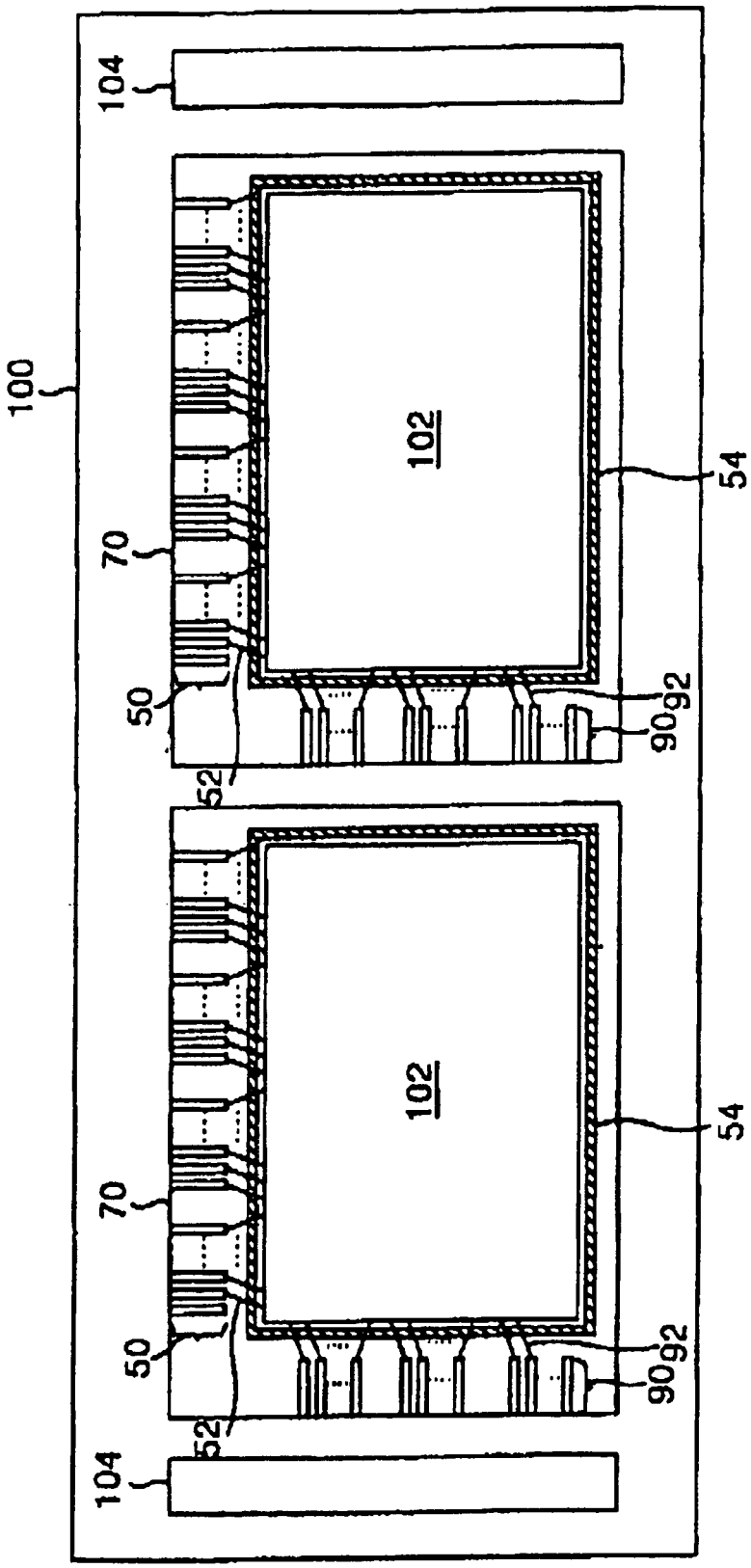
FIG. 12 represents a plane structure of the entire substrate provided with the EPD window and the lower plate of the liquid crystal display panel.

FIG. 12 represents a plane structure of the entire substrate provided with EPD windows and the lower plate of the liquid crystal display panel. As shown, a plurality of lower plates 70 are provided on a large substrate 100. The lower plates are by cutting work after etching is completed. Gate lines and data lines of a picture display part 102, a TFT of a liquid crystal cell, pads 50 and 90, and links 52 and 92 are provided on the lower plate 70.

Areas for the EPD windows 104 are positioned near the outer edge of the substrate 100. The purpose of the EPD windows is to allow for easy detection of gas generated during the etching process. To define the holes 56 and 94 between the links 52 and 92, respectively, the large substrate 100 is covered with the organic protective film 78 and a photoresist mask pattern is formed thereon. The large substrate 100 is then laid within an etching chamber.

As noted above, EPD window 104 is used to control the amount of etching. Although the EPD window 104 is etched at the same time when the holes 56 and 94 are etched, EPD window 104 is not any part of the circuitry of the LCD itself.

Figure 13:
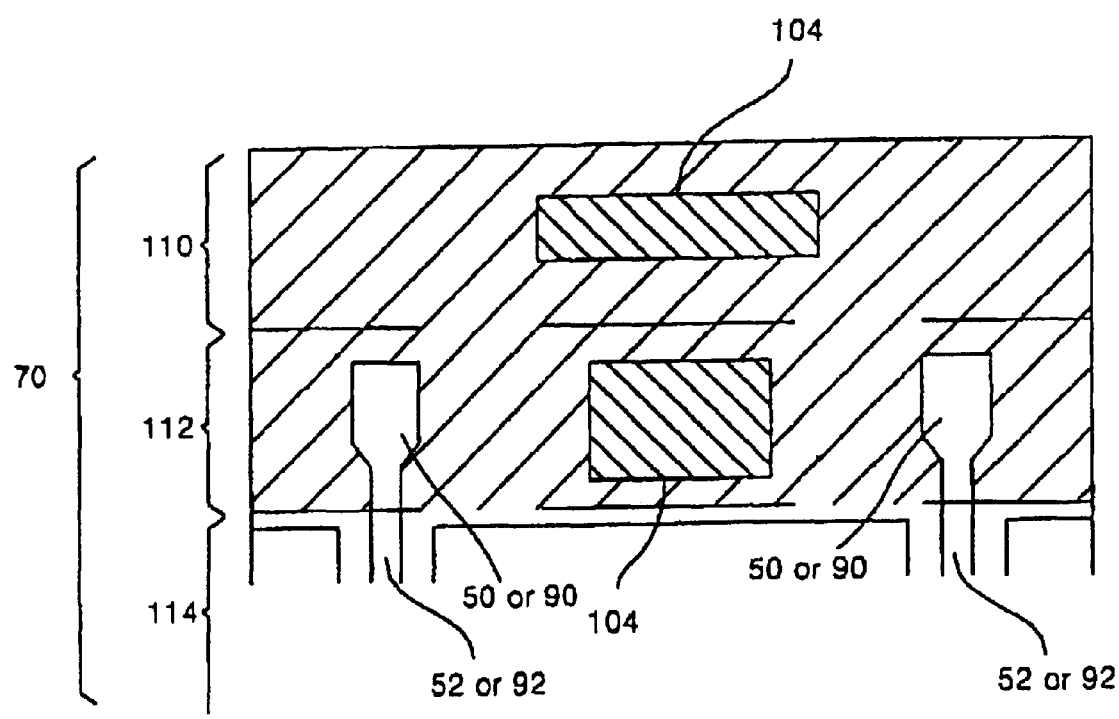
FIG. 13 represents a plane structure of the edge and the pad of the lower plate of the liquid crystal display panel provided with the EPD window.

The area of the EPD window 104 is made much wider than the actual pattern area of the lower plate 70 so that reaction gas generated during etching is increased to make the detection of gas easier. The EPD window 104 is not limited to the area as shown in FIG. 12, but can be formed on a non-display part 110 of the lower plate 70 or between the pads 50 and 90 at a pad part 112, as shown in FIG. 13.

Figure 14A:
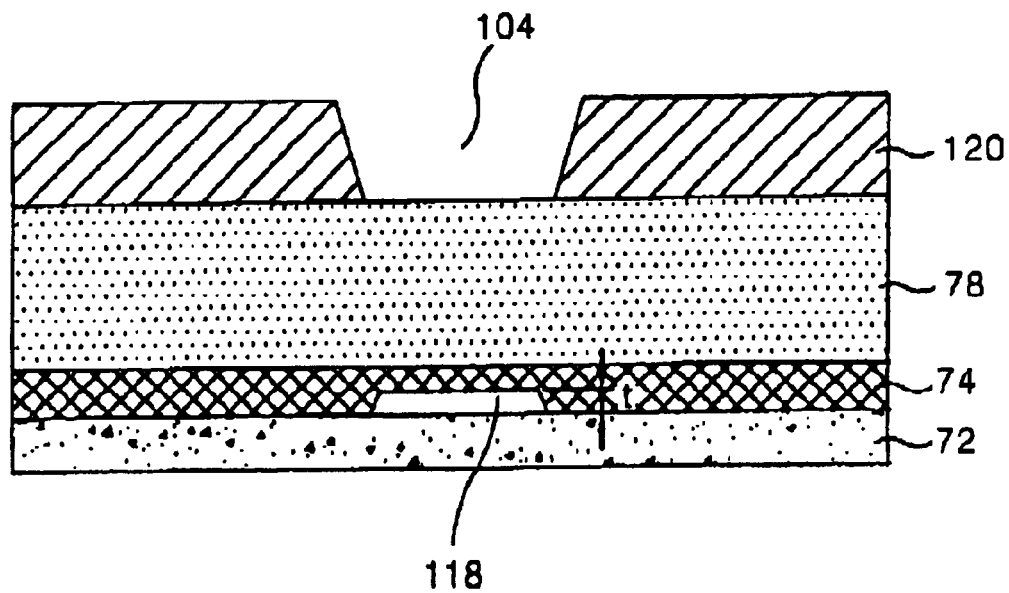
FIG. 14A to FIG. 14C are views for comparing a sectional structure of the EPD window area with an actual pattern area between the data and gate links to be provided with the holes.
Figure 14B:
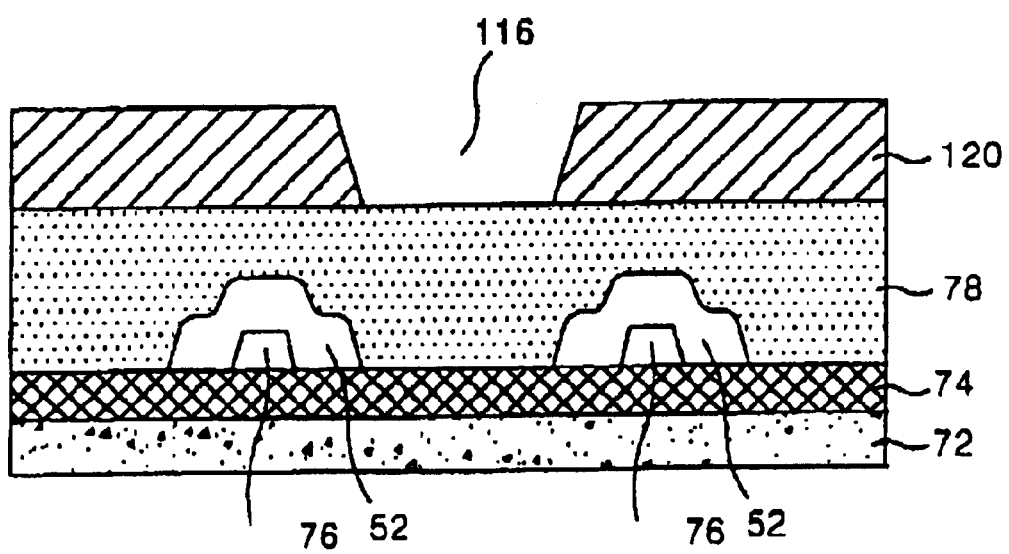
Figure 14C:
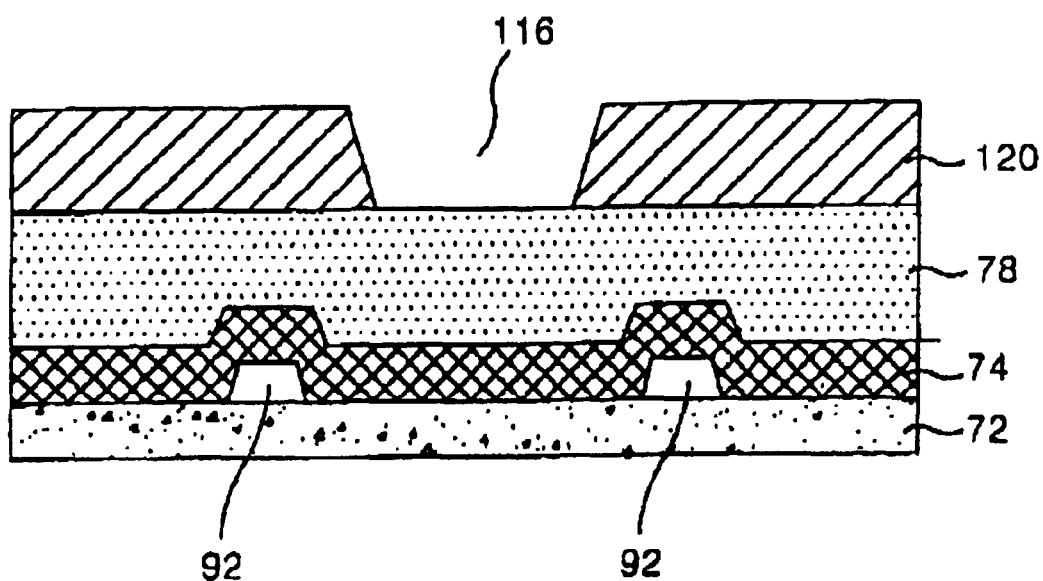

FIGS. 14A to 14C are views for comparing a sectional structure of the EPD window area with an actual pattern area between the data and gate links to be provided with the holes. More specifically, FIG. 14A is a sectional view of the EPD window 104 while FIG. 14B and FIG. 14C are sectional views of actual pattern windows 116 in which the holes 56 and 94 are formed, respectively.

Referring to FIGS. 14A to 14C, the gate insulating film 74 and the organic protective film 78 have the same thickness for each area. However, as shown in FIG. 14A, a dummy pattern 118 of a thickness t is formed below the area of the EPD window 14 on the glass substrate 72, and the gate insulating 74 is formed thereon. The thickness t represents a desired thickness of the gate insulating film 74 after the holes 56 and 94 are formed. The dummy pattern 118 is made from the same material as the gate electrode and the gate link 92.

The organic protective film 78 is evenly formed to a uniform thickness as shown in FIGS. 14A to 14C by a spin coating technique. Thereafter, a photoresist pattern 120 is formed on the organic protective film 78 to provide the EPD window 104 and the actual pattern windows 116 at the data and gate link parts.

The lower glass plate 72, with the photoresist pattern 120, is then put in an etching chamber and $SF_6$ gas is injected into the etching chamber. As seen, the photoresist pattern 120 is such that the organic protection film 78 is exposed to the etchant gas in the EPD window area 104 and the actual pattern areas 116 where the holes 56 and 94 are to be formed.

When the etching takes place, the etchant gas reacts with Si within the organic protective film 78 to generate non-volatile $SiF_4$ gas. After the organic protective film 78 is etched, the gate insulating film 74 becomes exposed. The etchant then reacts with Si within the gate insulating film 74 to generate the same non-volatile $SiF_4$ gas.

However, when the gate insulating film 74 is etched to expose the dummy pattern below the EPD window 104, $SiF_4$ is no longer generated and the density of the $SiF_4$ gas is dramatically reduced. At this point, the desired thickness t of the gate insulating film 74, where holes 56 and 94 are defined, is reached.

Figure 15:
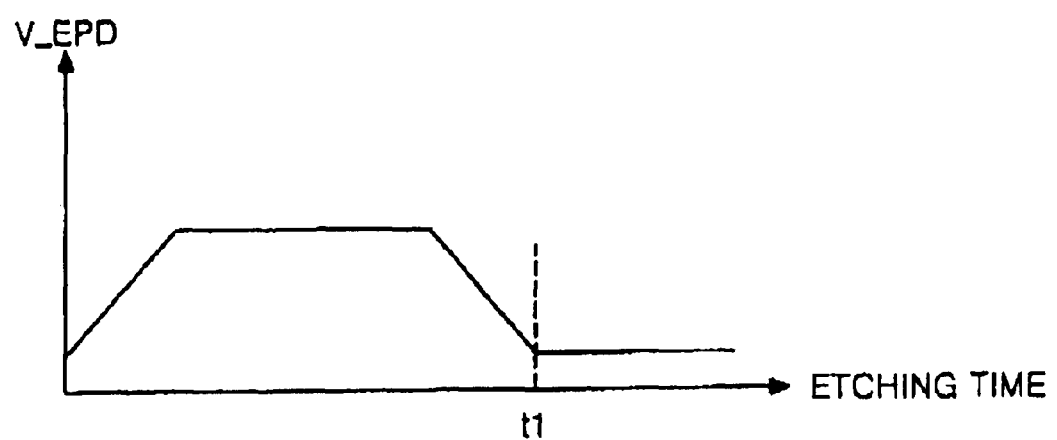
FIG. 15 is a waveform diagram of an electrical signal proportional to a density of $SiF_4$ gas detected during etching.

Thus, by monitoring the $SiF_4$ gas, the etching of the gate insulating film can be precisely controlled. FIG. 15 is a waveform diagram of an electrical signal proportional to a density of $SiF_4$ gas detected during etching. Using a gas detector, the graph as depicted in FIG. 15 can be generated. As shown, signal V_EPD is proportional to the density of the $SiF_4$ gas measured. At time t1, the dummy pattern 118 below becomes exposed, and the etching operation can be terminated.

Figure 16A:
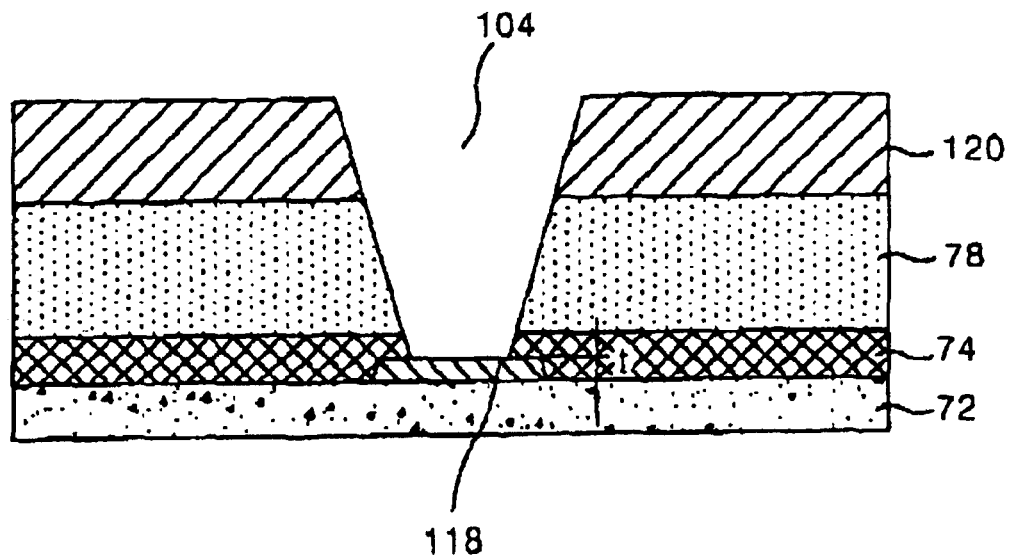
FIG. 16A to FIG. 16C are views for comparing a sectional structure of the EPD window area after completion of the etching work with the actual pattern area between the data and gate links.
Figure 16B:
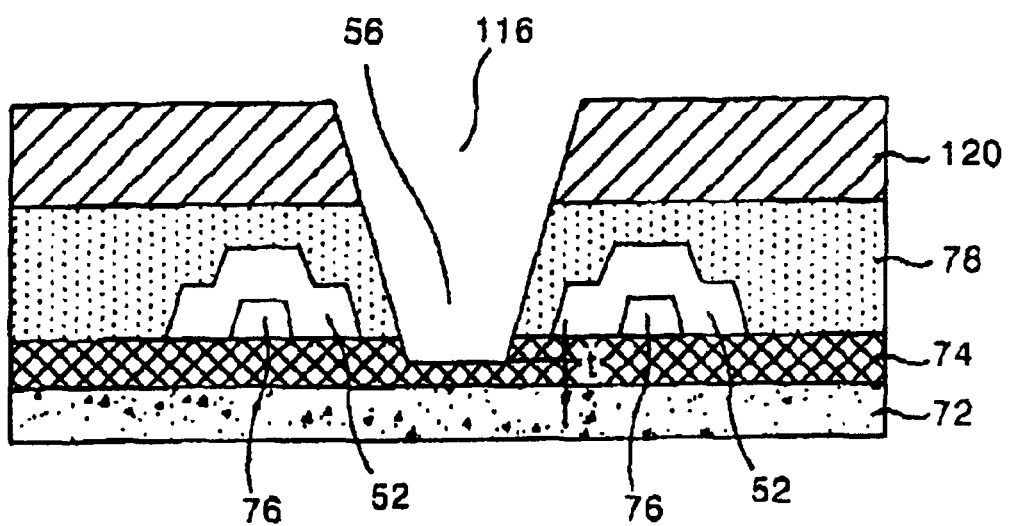
Figure 16C:
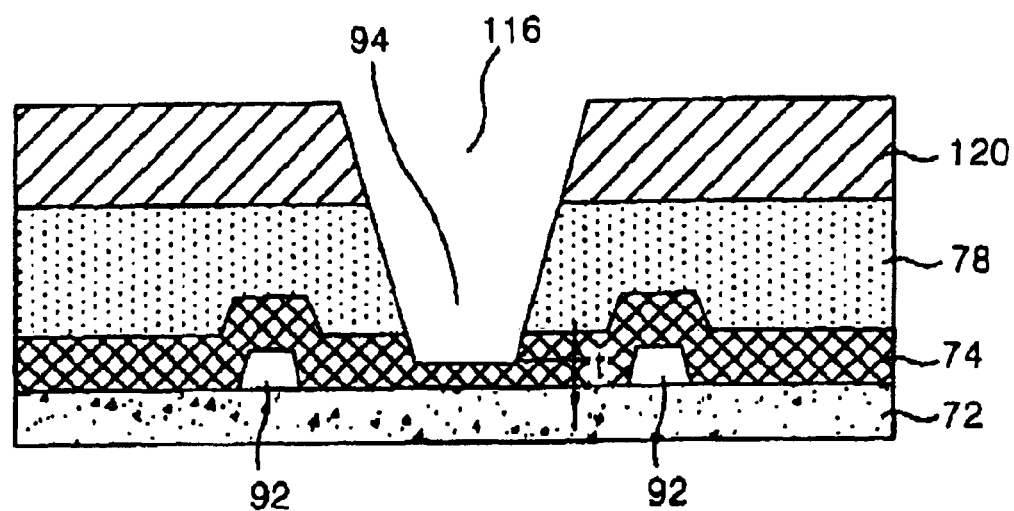

FIG. 16A to FIG. 16C are views for comparing a sectional structure of the EPD window area after completion of the etching work with the actual pattern area of the holes between the data and gate links. As shown in FIG. 16A, below the EPD window 104, the organic protective film 78 and the partial gate insulating film 74 to expose the dummy pattern 118.

Because the etching rate at the EPD window 104 is equal to the etching rate at the actual pattern window 116 where the holes 56 and 94 are formed, the depth of the holes 56 (FIG. 16B) and 94 (FIG. 16C) are equal of the depth of the hole formed below the EPD window 104 (FIG. 16A). As a result, the thickness of the gate insulating film 74 where holes 56 and 94 are formed are equal to the thickness of the dummy pattern 118.

Because the gate insulating film is not completely etched when the holes are formed, no undercuts are generated. Thus, when the lower and upper plates are bonded, strength of the bonding is maintained and the structural weakness is prevented.

As described above, in the embodiments of the prevent invention, holes are formed so that the seal bonds with inorganic materials such as glass substrate or the gate insulating film, which provides a dramatic improvement in bonding characteristics over the conventional art.

Further, it is possible to precisely control etching such that the gate insulating film is not completely etched when forming the holes. This prevents problems related with undercuts.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a liquid crystal display device wherein the devices includes gate electrode lines, electrode links and electrode pads within a picture display part of a liquid crystal display panel, a gate insulating film of an inorganic material on a substrate provided with the gate electrode lines, links and pads, forming data electrode lines, electrode links and electrode pads on the gate insulating film, an organic protective film on the gate insulating film provided with the data electrode lines, links and pads, and a seal crossing the gate and data electrode links on the organic protective film, said method comprising:

removing the protective film and partially removing the gate insulating film to a predetermined thickness to define holes between the gate electrode links and the data electrode links; and contacting the seal with the gate insulating film through the holes.

2. The method as claimed in claim 1, wherein the protective film and the gate insulating film are continuously removed by the dry etching technique.

3. The method as claimed in claim 2, further comprising:

forming a dummy pattern having said predetermined thickness before forming the gate insulating film at a predetermined area of the substrate prior to the dry etching work;

forming an etch point detection window at an area provided with the dummy pattern; and terminating the etching process when the dummy pattern has been exposed from the etch point detection window during the dry etching.

4. The method as claimed in claim 1, wherein the holes are extended into the outside of an area occupied by the seal.

5. The method as claimed in claim 3, wherein the terminating the etching process step comprises:

monitoring reactive gas generation; and terminating when the reactive gas is no longer being generated.

6. A method to form a lower plate of a liquid crystal device, the method comprising:

forming a glass plate;

forming a gate insulating film over said lower glass plate such that at least a portion of said gate insulating film defines an adherence surface;

forming a protective film over said gate insulating film such that at least a portion of said adherence surface is exposed; and forming a seal over said gate insulating film to make contact with said adherence surface.

7. The method of claim 6, wherein said adherence surface is defined on said glass plate by forming at least one hole in said gate insulating film to expose at least a portion of a surface of said glass plate.

8. The method of claim 6, further comprising:

forming a plurality of gate links between said lower glass plate and said gate insulation film.

9. The method of claim 8, wherein said adherence surface is disposed between at least two adjacent gate links.

10. The method of claim 6, further comprising:

forming a plurality of data links between said gate insulation film and said protective film.

11. The method of claim 10, wherein said adherence surface is disposed between at least two adjacent data links.

12. The method of claim 6, wherein said adherence surface extends beyond an edge of said seal.

13. The method of claim 6, wherein said adherence surface is inorganic.

14. A method to control a thickness of a gate insulation film remaining after etching, the method comprising:

forming an etch point detection window such that a dummy pattern of a predetermined thickness is formed below said gate insulation film;

simultaneously etching said etch point detection window and an actual pattern area; and terminating the etching process when said dummy pattern becomes exposed.

15. The method of claim 14, wherein said terminating step comprises:

monitoring said etch point detection window for generation of reactive gases; and terminating said etching process when said generation of reactive gases falls to or below a predetermined level.

16. The method of claim 14, wherein the etch point detection window is wider than the actual pattern area.

17. The method of claim 14, wherein the gate insulation film is part of a display device having a display part and a non-display part, and in the forming step, the etch point detection window is formed on the non-display part or on a pad portion of the display part.

18. The method of claim 14, wherein the predetermined thickness of the dummy pattern represents a desired thickness of the gate insulation film remaining after the etching, at where the etching occurred.

19. The method of claim 14, wherein the forming step includes:

forming a gate insulation film on a substrate;

forming an organic protective film on the gate insulation film; and forming a photoresist pattern on the organic protective film to form the etch point detection window and the actual pattern area.

20. The method of claim 19, wherein the simultaneously etching step includes:

placing the substrate having the formed etch point detection window and the actual pattern area, in an etching chamber; and injecting an etching gas into the etching chamber.

21. The method of claim 14, wherein, in the simultaneously etching step, an etching rate at the etch point detection window and an etching rate at the actual pattern area are the same.

22. The method of claim 14, wherein the actual pattern area includes at least one of the following:

an area between two adjacent data links; and an area between two adjacent gate links.

23. The method of claim 15, wherein the reactive gases include non-volatile $SiF_4$ gas.

* * * * *